United States Patent [19]

Hart

[11] Patent Number: 4,602,348

[45] Date of Patent: Jul. 22, 1986

[54] DECONVOLUTION METHOD AND APPARATUS

[76] Inventor: Hiram E. Hart, 3400 Wayne Ave., Bronx, N.Y. 10467

[21] Appl. No.: 450,914

[22] Filed: Dec. 20, 1982

[51] Int. Cl.⁴ .................. G06F 15/31; G06F 15/42
[52] U.S. Cl. ............................... 364/581; 364/414; 382/42
[58] Field of Search ............. 364/581, 414, 300, 514; 378/4; 73/574; 382/42

[56] References Cited

U.S. PATENT DOCUMENTS

| | | | |
|---|---|---|---|
| 4,066,903 | 1/1978 | LeMay | 364/414 |
| 4,209,780 | 6/1980 | Fenimore et al. | 382/42 |
| 4,330,833 | 5/1982 | Pratt et al. | 382/42 |
| 4,360,797 | 11/1982 | Fenimore et al. | 382/42 |
| 4,446,521 | 5/1984 | Innouye | 364/414 |

*Primary Examiner*—Edward J. Wise

*Attorney, Agent, or Firm*—Kirschstein, Kirschstein, Ottinger & Israel

[57] ABSTRACT

A combined experimental and analytical method and apparatus for determining radioisotope tissue concentrations from a series of two-dimensional scans is proposed. Each two-dimensional scan is identified as the output from the unknown three-dimensional radioisotope tissue distribution as appropriately modified or convoluted by a series of independently determined depth-dependent point source response functions of the system. A direct non-local method of iterative deconvolution which is relatively insensitive to random noise is used to determine the unknown tissue concentration from the measured scan data and the known point source response characteristics of the system. The series of depth-dependent two-dimensional scans can be parallel to each other or at a series of arbitrary angles of orientation to the unknown source distribution.

2 Claims, 13 Drawing Figures

DECONVOLUTION METHOD AND APPARATUS

TECHNICAL FIELD OF THE INVENTION

This invention relates to the determination of the distribution and intensity of multiple signal sources of essentially unknown spatial and/or temporal characteristics in the presence of noise and distortion by means of appropriate measurement and analysis.

DESCRIPTION OF THE PRIOR ART

In many communications applications it is desired to extract information of known frequency, phase, or repetitive characteristics from a noisy signal. Many techniques have been developed to successfully discriminate against essentially random noise and so dramatically improve the signal to noise ratio. In radioisotope measurements and many other applications, however, the signal is itself intrinsically randomly fluctuating, and many of the communications techniques are not applicable. Furthermore in, for example, radioisotopic organ scans the information desired is typically three-dimensional (four-dimensional if time-dependent dynamic functions are being studied), while the measured outputs are often only two-dimensional scans. Specialized equipment and methods of data analysis have therefore been developed in the field of radioisotopic medical imaging, such as described in "Radionuclide Section Scanning," by Ell et al., Grune & Stratton, 1982. Radioisotope tissue distributions have been determined using positron emission coincidence techniques, such as described in "Pett VI: A Positron Emission Tomograph Utilizing Cesium Fluoride Scintillation Detectors," Ter-Pogossian et al., Journal of Computer Assisted Tomography, Vol. 6(1), pp. 125–133, Feb. 1982. These methods are currently limited as to the organs scanned, the available positron emitting isotopes and require specialized equipment usually with either $2\pi$ planar or $\sim 4\pi$ solid angle geometries. Attempts have also been made, e.g. see "The Mark IV System for Radionuclide Computed Tomography of the Brain," Kuhl et al., Radiology, Vol. 121, pp. 405–413, Nov. 1976, to reconstruct three-dimensional radioisotopic tissue distributions by acquiring two-dimensional single gamma scan data at different angles of projection. Various methods of carrying out three-dimensional reconstruction from the input data are described in U.S. Pat. No. 4,052,618 and in "Image Reconstruction From Projections" by Gabor T. Herman, Academic press, 1980. Here, too, specialized equipment usually with $2\pi$ planar or $\sim 4\pi$ solid angle geometries were employed.

In general, the mathematical difficulties associated with a formal linear algebraic approach to the problem of determining the three-dimensional tissue distributions from measured data are very formidable. Formal solutions would not only involve inversion of a series of relatively large three-dimensional point source response matrices, but the utilization of noisy data appropriately weighted in accordance with overall statistical optimization constraints. In view of these difficulties, it has been customary instead to use various iterative approximation techniques, generally making use of projective data at multiple angles of orientation. It should be noted, however, that if the point source response is itself sufficiently depth dependent, there is, in principle, no a priori requirement that multiple projections be taken. The difficulty in analyzing sets of parallel plane noisy data will be seen to lie rather in large part in the convergence and instability characteristics of the classic Gauss-Seidel method (GSM) of iterative deconvolution.

In GSM, a distribution is assumed; the anticipated output based upon the assumed distribution and the known point source response functions (PSRFs) is calculated; and the difference between the successive calculated outputs and the measured data is used iteratively on a point-by-point basis to improve the successive estimates. In GSM, it is an implicit assumption therefore that the PSRF be rather highly peaked so that the value of a given data point is majorly attributable to the signal from a particular small region (ideally a single tissue element). This is equivalent to the formal mathematical sufficient condition that the Gauss-Seidel method converge, namely that $$|a_{ii}| > \sum_{j \neq i} |a_{ij}|; i = 1, 2 \ldots n$$

where n is the number of equations.

For reference, see "A Guide To Fortran IV Programming," 2d edition, by Daniel D. McCracken, John Wiley 1972. This method is quite successful in analyzing ideal data, converging rapidly to the correct distributions when the convergence condition holds. If, however, the PSRF is broad, extending well beyond the region of a single pixel, the Gauss-Seidel method becomes unstable, exhibiting somewhat extended characteristic patterns even for ideal point source data. Grossly incorrect solutions for the tissue distribution result when the normal fluctuations associated with measurements of radioactivity are present in the point source data. The breakdown in the Gauss-Seidel method of analysis is even more apparent when data from multiple point sources or extended sources is deconvoluted since spurious calculational resonances majorly distort the output. Moreover, these spurious resonances can occur even with ideal data. To obviate the above difficulties, various smoothing, filtering and transform methods have been developed for initial modification of the data prior to carrying out the actual deconvolution. These methods have met with some success in reducing instabilities, but the ultimate resolution then obtainable is necessarily compromised by any errors or approximations introduced in the initial data transformation process.

It follows then that there has not been a generally effective method for direct deconvolution of the input data arising from source distributions when the transfer function(s), i.e. the PSRF(s), of the measuring system is relatively broad even if the data is quite accurate. If, in addition, the data sets exhibit even modest statistical fluctuations, the resolution obtainable with current deconvolution techniques is significantly limited. This limitation is in fact not too surprising since accurate deconvolution of noisy data taken with a broad PSRF is, of course, roughly analogous to imaging fine detail with blurry methods of measurement and in the presence of random noise. Nonetheless, it will be shown below that, if the noisy data is treated in a completely symmetrical and appropriately weighted fashion, surprisingly accurate deconvolutions are possible.

Before describing the invention, it will be convenient to review the process of deconvolution in one dimension.

Consider the radioisotope concentration distribution $C(x)$ which is being scanned by a moving collimator detector having the point source response function $F(X-x)$, where $X$ represents the coordinate of the collimator axis, and where $x$ represents the coordinate of a signal producing element. The response function (i.e. transfer function) $F(X-x)$ can be determined accurately by slowly and carefully scanning a known point source. The one-dimensional analog of the three-dimensional radioisotope tissue determination problem is then to find the unknown radioisotope distribution function $C(x)$ from the known transfer function $F(X-x)$ and the measured scan output $M(X)$. This is, of course, mathematically equivalent to solving the well known convolution equation:

$$M(X) = \int_{-\infty}^{\infty} F(X - x) C(x) dx$$

For selected analytic $F(X-x)$ functions, $C(x)$ can in principle be determined by standard analytic methods. As indicated above, however, if $M(X)$ is statistically randomized, and the $F(X-x)$ is known only as a discrete numerical array, then $C(x)$ is not easily found analytically.

A typical prior art Gauss-Seidel numerical solution proceeds as follows:

(a) Assume an initial estimate $$E_o(x) = \frac{M(X)}{\beta}$$

where $\beta$ is any convenient positive number $$\sim \int_{-\infty}^{\infty} F(x) dx$$

(b) Numerically calculate the output which the initial estimate $E_o(x)$ would predict:

$$C_1(X) = \int_{-\infty}^{\infty} F(X - x) E_o(x) dx$$

(c) The next estimate is given by $$E_1(x) = E_o(x) + \frac{M(X) - C_1(X)}{\beta'}$$

where $\beta'$ is again any convenient positive number, usually $\sim \beta$.

Generalizing the above GSM procedure:

$$E_i(x) = E_{i-1}(x) + \frac{M(X) - C_{i-1}(X)}{\beta'}$$

The Gauss Seidel method is more likely to give realistic results if $\beta'$ is made relatively large to suppress instabilities and, in radioisotope applications, if the successive estimates $E_i(x)$ are required to be positive.

Note that the correction term $$\frac{M(X) - C_i(X)}{\beta'}$$

for the element at $x$ depends upon the difference between the measured and calculated values at only the single data element at $X$, where $X$ here represents, of course, the coordinate of the collimator axis when the collimator is centered directly above the tissue element of interest at $x$. For sharp transfer functions, the Gauss-Seidel iterative approach is excellent with ideal data and reasonably accurate for moderately noisy data. It fails, however, for broader PSRFs and noisy data. This is not surprising, because, in the latter situation, the measured value at $x$ is, in general, only minimally dependent upon the radioactivity of any one tissue element.

Gauss-Seidel calculations which use the raw measurement data set $M(X)$ almost always give rise to spurious peaks and valleys probably arising from iteratively amplified and propagated local noise. In an effort to prevent such calculational artifacts, local smoothing algorithms are often used. Since the actual data, however imperfect, is all that is really available, it would appear that local smoothing while limiting the effects of statistical fluctuations is also reducing the ultimate resolution achievable. Local data smoothing techniques can also be viewed, in a sense, as simply enlarging the effective pixel spacing and, by comparison, sharpening (narrowing) the PSRF of the system so that the Gauss-Seidel approach becomes more applicable.

The novel features which are considered as characteristic of the present invention are set forth in particular in the appended claims. The deconvolution method and apparatus, both as to their construction and their mode of operation, together with additional features and advantages thereof, will be best understood upon perusal of the following detailed description of a specific embodiment with reference to the accompanying drawings.

DETAILED DESCRIPTION OF THE PREFERRED EMBODIMENT

The above-cited difficulties of the prior art can now be substantially reduced with a non-local iterative method (NLM) which tends to optimally extract the information desired. A basic feature of the invention being proposed is a new kind of iterative approach which is so structured that each successive iterative correction reflects the total set of relevant unaltered input data. This is in direct contrast to the GSM approach where each successive iterative correction reflects only the difference between the measured and calculated values at each particular data point. NLM can be formulated in a variety of ways, but the preferred embodiment is detailed below.

Assume for a three-dimensional volume distribution that the PSRFs of the measuring system are perfectly known, and that an initial estimate of the tissue distribution has been made. For example, the initial estimate might be that all tissue element concentrations are equal.

Assume now further that only a single data point measurement is available and consider what correction to the assumed distribution is suggested by that single measurement.

On the basis of the initial estimate $DECONV_1(x,y,z)$, the calculated value of the single measured data point $D(\alpha, \beta, \gamma)$ should be:

$$Calc(\alpha,\beta,\gamma) = \sum_{x,y,z} DECONV_1(x,y,z) \cdot PSRF(\alpha - x, \beta - y, \gamma - g)$$

If $Calc(\alpha, \beta, \gamma) = D(\alpha, \beta, \gamma)$, then clearly no change in the initial estimate is indicated.

However, if $\frac{D(\alpha,\beta,\gamma)}{Calc(\alpha,\beta,\gamma)} \equiv CR(\alpha,\beta,\gamma) \neq 1$ then, in the absence of any other information, all that can be symmetrically assumed is that a second improved estimate of the distribution is given by $DECONV_2(x,y,z) = CR(\alpha, \beta, \gamma) \cdot DECONV_1(x,y,z)$ for all nearby x,y,z.

That is to say, all elements of the intial estimated tissue distribution within range of the non-vanishing elements of the PSRF are multiplied by the constant correction ratio $CR(\alpha, \beta, \gamma)$.

Suppose now a second data element $D(\theta, 100, \psi)$ is measured. If $$\frac{D(\theta,\phi,\psi)}{Calc(\theta,\phi,\psi)} \equiv CR(\theta,\phi,\psi) = CR(\alpha,\beta,\gamma),$$

then both measurements suggest the same correction procedure, namely:

$$DECONV_2(x,y,z) = CR \cdot DECONV_1(x,y,z)$$

where $CR = CR(\theta, \phi, \psi) = CR(\alpha, \beta, \gamma)$
for all elements of the tissue distribution (x,y,z) within range of the non-vanishing elements of the PSRF(s) about either of the two measured data points $(\alpha, \beta, \gamma)$ and $(\theta, \phi, \psi)$.

If, however $$CR(\theta, \phi, \psi) \neq CR(\alpha, \beta, \gamma)$$

and assuming there exists at least one tissue element (x',y',z') within the overlapping ranges of the PSRF(s) about $(\alpha, \beta, \gamma)$ and $(\theta, \phi, \psi)$, then it is clear that an ambiguity has arisen.

While both correction ratios should somehow be taken into account, it is obvious that the two differing ratios $CR(\alpha, \beta, \gamma)$ and $CR(\theta, \phi, \psi)$ may not be equally predictive in correcting the estimated concentrations in the various tissue elements (x',y',z') within the overlapping PSRF ranges. Hence, it is necessary to formulate a basis for calculating an overall correction ratio $\overline{CR}$ from the individual correction ratios CR.

DETERMINATION OF AN OVERALL CORRECTION RATIO

In a preferred embodiment of the data acquisition and processing invention here proposed, the relative predictability of the correction ratio CR arising from a single measurement data value D(X,Y,Z) in improving the tissue element concentration estimate at the point (x',y',z') and as compared with the correction ratios arising from the other measured data values is given by the product of two factors:

$$F_1 \cdot F_2$$

where $F_1$ reflects the inherent relative statistical reliability of the measurement D(X,Y,Z) and where $F_2$ is a measure of the relative extent to which the correction ratio calculated from D(X,Y,Z) depends upon the current estimate of the radioisotopic concentration of the tissue element at (x',y',z'). The factors $F_1$ and $F_2$ are specified below in detail for a preferred embodiment.

The overall correction ratio $\overline{CR}$ for each individual tissue volume element (x', y',z') can then be specified, as one choice, by a simple weighted mean, and the L+1 iterative estimate therefore can be given by the relation:

$$DECONV_{L+1}(x',y',z') = \overline{CR}_{L+1}(x',y',z') \cdot DECONV_L(x',y',z')$$

where generalizing to any tissue element (x,y,z):

$$\overline{CR}(x,y,z) = \frac{\sum_{X,Y,Z}[CR_L(X,Y,Z)F_1(X,Y,Z)F_2(X-x,Y-y,Z-z)]}{\sum_{X,Y,Z}[F_1(X,Y,Z)F_2(X-x,Y-y,Z-z)]}$$

where: $CR_L(X,Y,Z) = \dfrac{D(X,Y,Z)}{Calc_L(X,Y,Z)}$ and where: $Calc(X,Y,Z) =$ $$\sum_{x,y,z}[DECONV_L(x,y,z) \cdot PSRF(X-x, Y-y, Z-z)]$$

As noted above, $F_1(X,Y,Z)$, the relative reliability of the measurement at data point $(X,Y,Z)$ can be specified in many ways. In the preferred embodiment, it is defined as the likelihood that two successive measurements $M_1$ and $M_2$ at $(X,Y,Z)$ will fall within an arbitrary P% of each other ($P<<100$), or more formally that:

$$\frac{M_1 - M_2}{\overline{M}} = \frac{\Delta M}{\overline{M}} < \frac{P}{100}, \text{ where } \overline{M} = \frac{M_1 + M_2}{2}.$$

For a normal distribution of the form $$e - \frac{1}{2}\frac{(s-\mu)^2}{\sigma}$$

the probability that two successive measurements of s fall within P % of each other is $$\frac{P}{100}\left[\frac{\mu}{\sqrt{\pi\sigma}} + \frac{1}{\pi}\right].$$

For measurements of $\mu \gtrsim 100$ counts/pixel above a background BKGD of ~ 100 counts/pixel, the first term in the square brackets of the above expression dominates. Therefore, the relative reliability of multiple pixel measurements is given by the approximation:

$$F_1 \alpha \frac{D(X,Y,Z)}{\sqrt{D(X,Y,Z) + BKGD}}$$

The factor $F_2$ representing the relative extent to which the correction ratio CR calculated from $D(X,Y,Z)$ reflects the radioisotopic concentration at $(x,y,z)$, can also be defined in various ways. A preferred embodiment is suggested by noting that the correction ratio of the kth measured pixel element following the Lth iteration is given by $$CR_L(k) = \frac{D(k)}{Calc_L(k)} = \frac{D(I)_k + D(NI)_k}{C(I)_{kL} + C(NI)_{kL}}$$

where the measured data value of the kth pixel D(k) is the sum of the contribution of the Ith tissue element (i.e., $D(I)_k$) and all other contributions (i.e., $D(NI)_k$), and where the calculated value of the kth pixel can be similarly separated as a sum of the calculated contribution of the Ith tissue element (i.e., $C(I)_{kL}$) and the calculated contribution of all other tissue elements (i.e., $C(NI)_{kL}$). $CR_L(k)$ can be rewritten as:

$$CR_L(k) = \frac{\dfrac{D(I)_k}{C(I)_{kL}} + \dfrac{D(NI)_k}{C(NI)_{kL}} \cdot \dfrac{C(NI)_{kL}}{C(I)_{kL}}}{1 + \dfrac{C(NI)_{kL}}{C(I)_{kL}}}$$

$CR_L(k)$ is therefore simply a weighted average in which the contribution to $CR_L(k)$ from the Ith tissue element, $$\frac{D(I)_k}{C(I)_{kL}},$$

has a relative weight of unity, while the contribution of all other tissue elements, $$\frac{D(NI)_k}{C(NI)_{kL}},$$

is assigned the relative weight $$\frac{C(NI)_{kL}}{C(I)_{kL}}.$$

It follows therefore that $CR_L(k)$ reflects the contribution of the Ith tissue element only to the extent of 1 part in $$1 + \frac{C(NI)_{kL}}{C(I)_{kL}}$$

parts or $$\frac{1}{1 + \dfrac{C(NI)_{kL}}{C(I)_{kL}}} = \frac{C(I)_{kL}}{C(I + NI)_{kL}} = \frac{C(I)_{kL}}{C(\text{all})_{kL}}$$

It is reasonable, therefore, to assume that:

$$F_{2kL}^{(I)} \approx \frac{C(I)_{kL}}{C_{kL}}$$

In summary, the iterative deconvolution algorithm employed in the preferred embodiment of the invention is:

$$DECONV_{L+1}(x,y,z) = \overline{CR}_{L+1}(x,y,z)DECONV_L(x,y,z) \text{ where:}$$

$$CR_{L+1}(x,y,z) =$$

-continued $$\Sigma_{X,Y,Z} \left[ \frac{D(X,Y,Z)^2 PSRF(X-x, Y-y, Z-z)}{[\Sigma_{x',y',z'} DECONV_L(x',y',z') PSRF(X-x', Y-y', Z-z')]^2} \cdot \frac{DECONV_L(x,y,z)}{\sqrt{D(X,Y,Z) + BKGD}} \right]$$

$$\Sigma_{X,Y,Z} \left[ \frac{D(X,Y,Z) PSRF(X-x, Y-y, Z-z)}{[\Sigma_{x',y',z'} DECONV_L(x',y',z') PSRF(X-x', Y-y', Z-z')]} \cdot \frac{DECONV_L(x,y,z)}{\sqrt{D(X,Y,Z) + BKGD}} \right]$$

EXAMPLES

The above deconvolution algorithm has been tested on one-dimensional data sets for single point sources and precisely known point source response functions.

Figure 1A:
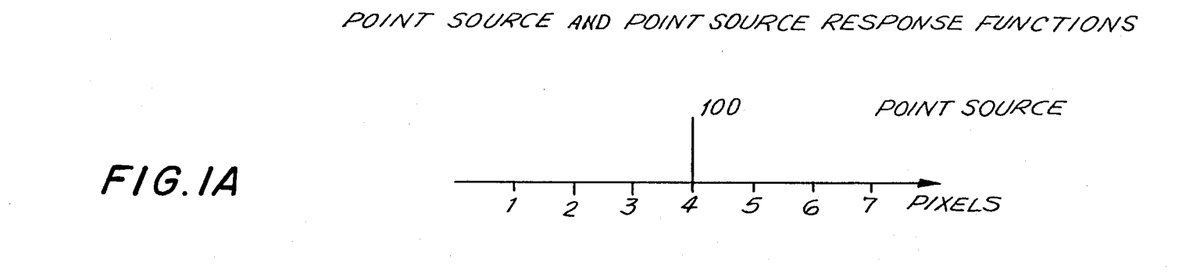
FIG. 1A is a schematic representation of a point source.
Figures 1B, 1C, 1D:
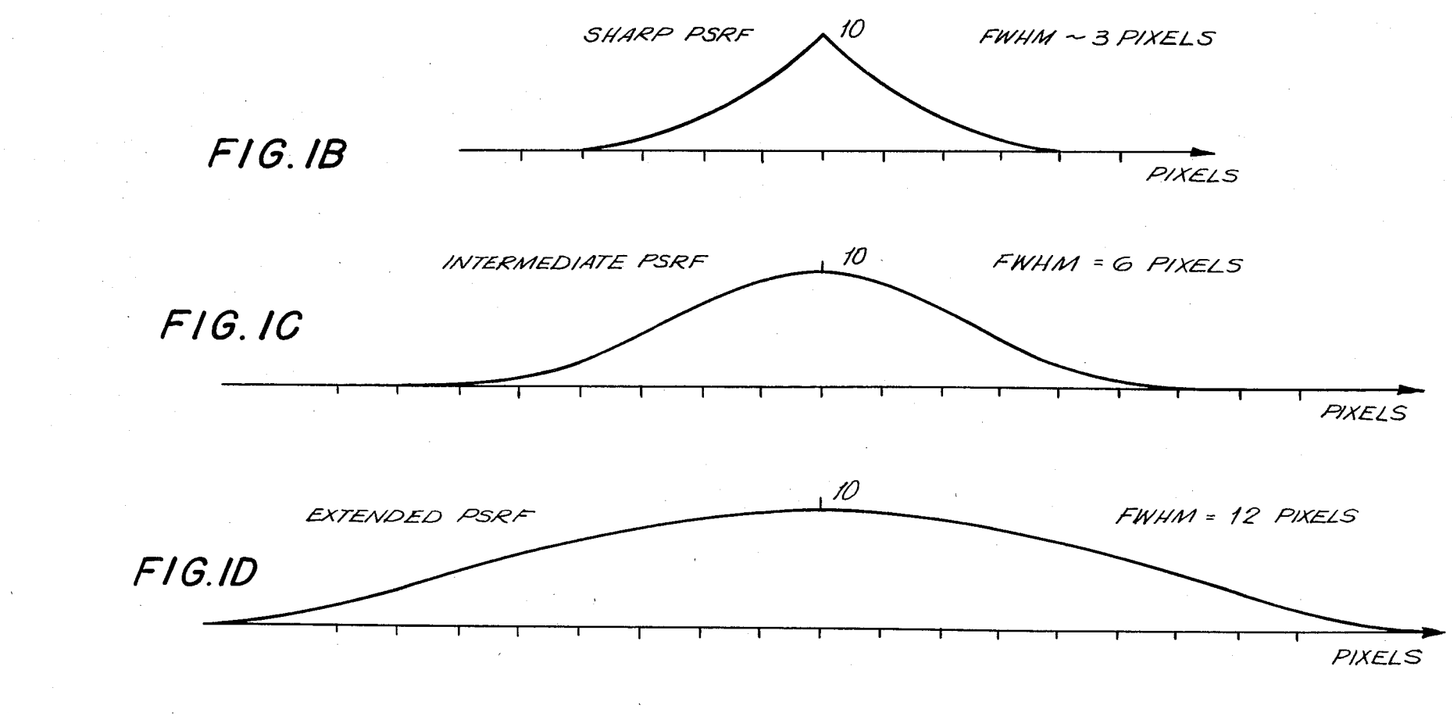
FIGS. 1B, 1C and 1D are schematic respective representations of sharp, intermediate and extended point source response functions for the point source of FIG. 1A.

Referring now to the drawings in detail, FIG. 1A depicts a point source of 100 unit strength centrally located at pixel point 4. As for FIGS. 1B, 1C and 1D, they depict the point source response function for various measurement systems. The term FWHM refers to the full width at half maximum characteristic of the PSRF as measured in pixels. The central peak value of 10 for each point source response function in FIGS. 1B, 1C and 1D indicates that the respective measuring system will record a value of 10 when it is directly above a unit point source. The symmetrical fall-off on either side of each central peak indicates the decrease in counts recorded by the respective measuring system with successive lateral off-sets relative to the unit point source.

Figure 2:
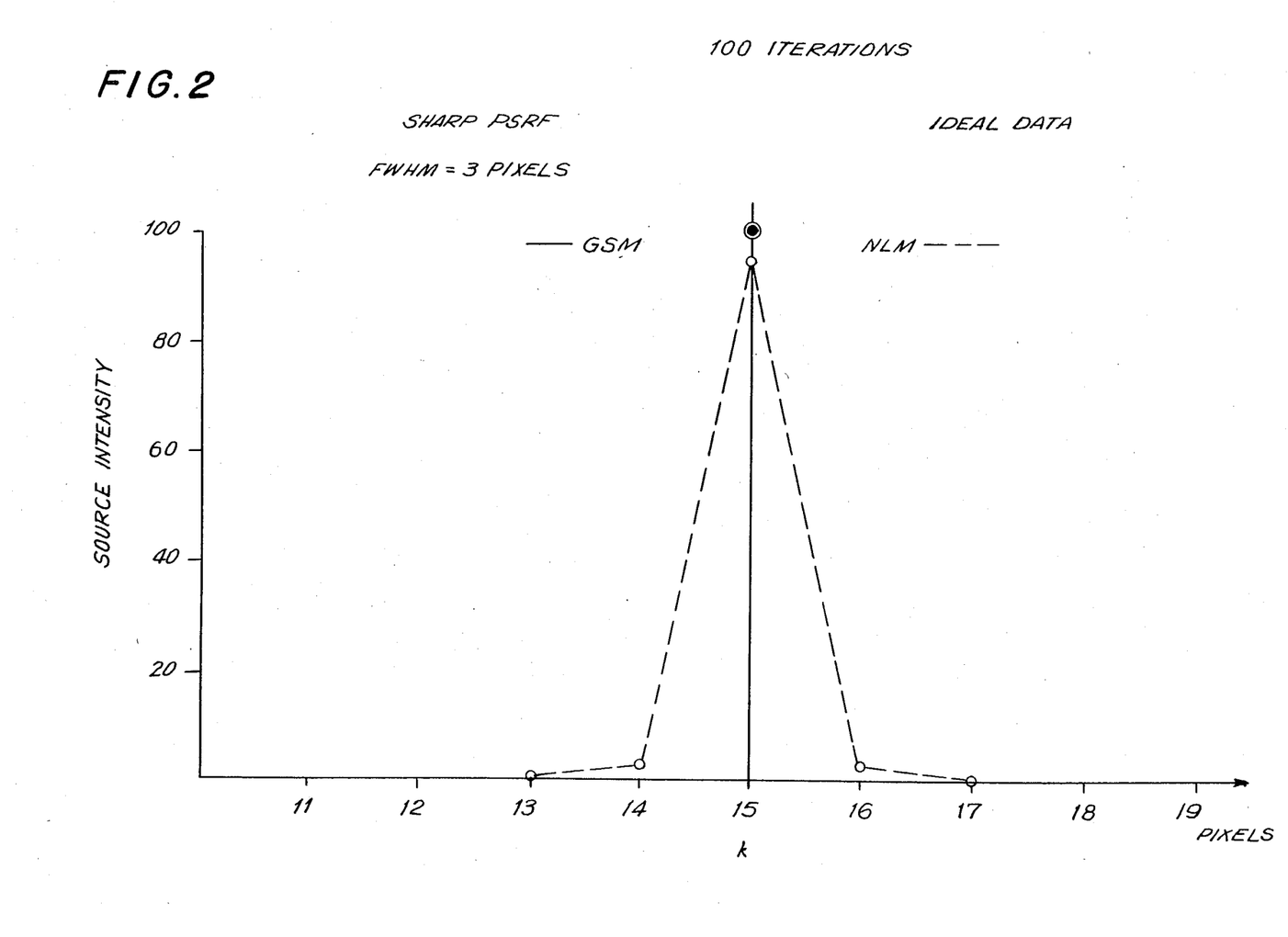
FIG. 2 is a graphic representation comparing the Gauss-Seidel method with the non-local method in accordance with this invention for ideal data after 100 iterations for the single point source of FIG. 1A and for the point source response function of FIG. 1B.

As shown in FIG. 2, for a sharp PSRF (i.e., FWHM=3 pixels) and for ideal data, the Gauss-Seidel method (GSM) converges rapidly to the known point source distribution, while the non-local method (NLM) of this invention also converges to the correct value, but more slowly.

Figure 3:
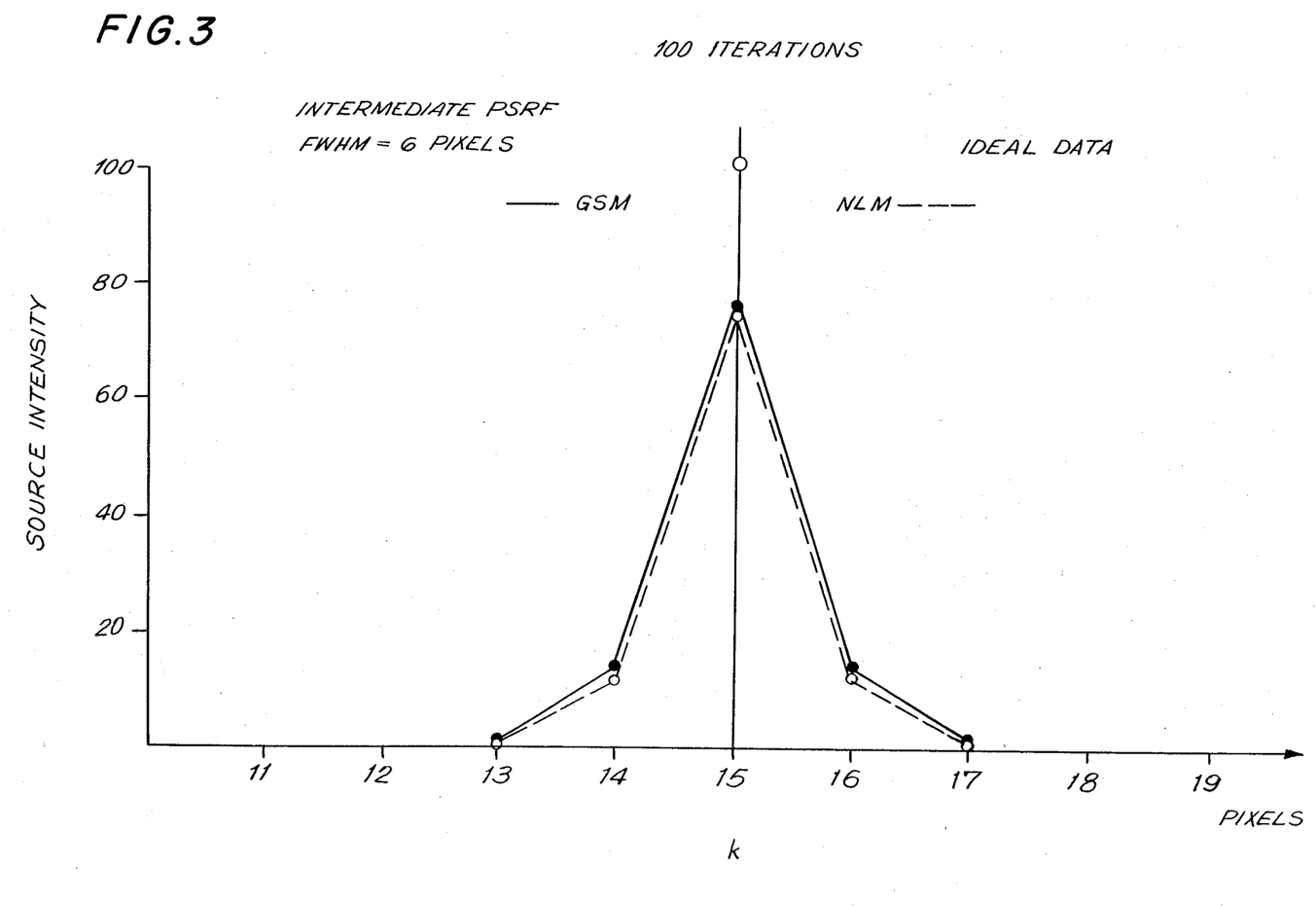
FIG. 3 is a graphic representation comparing the Gauss-Seidel method with the non-local method in accordance with this invention for ideal data after 100 iterations for the single point source of FIG. 1A and for the point source response function of FIG. 1C.

As shown in FIG. 3, for an intermediate PSRF (FWHM=6 pixels) and exact data, GSM converges more slowly than in the previous case and, in the limit, tends to define a slightly extended source. NLM converges about as rapidly as GSM, but gives rise to a somewhat more accurate result.

Figure 4:
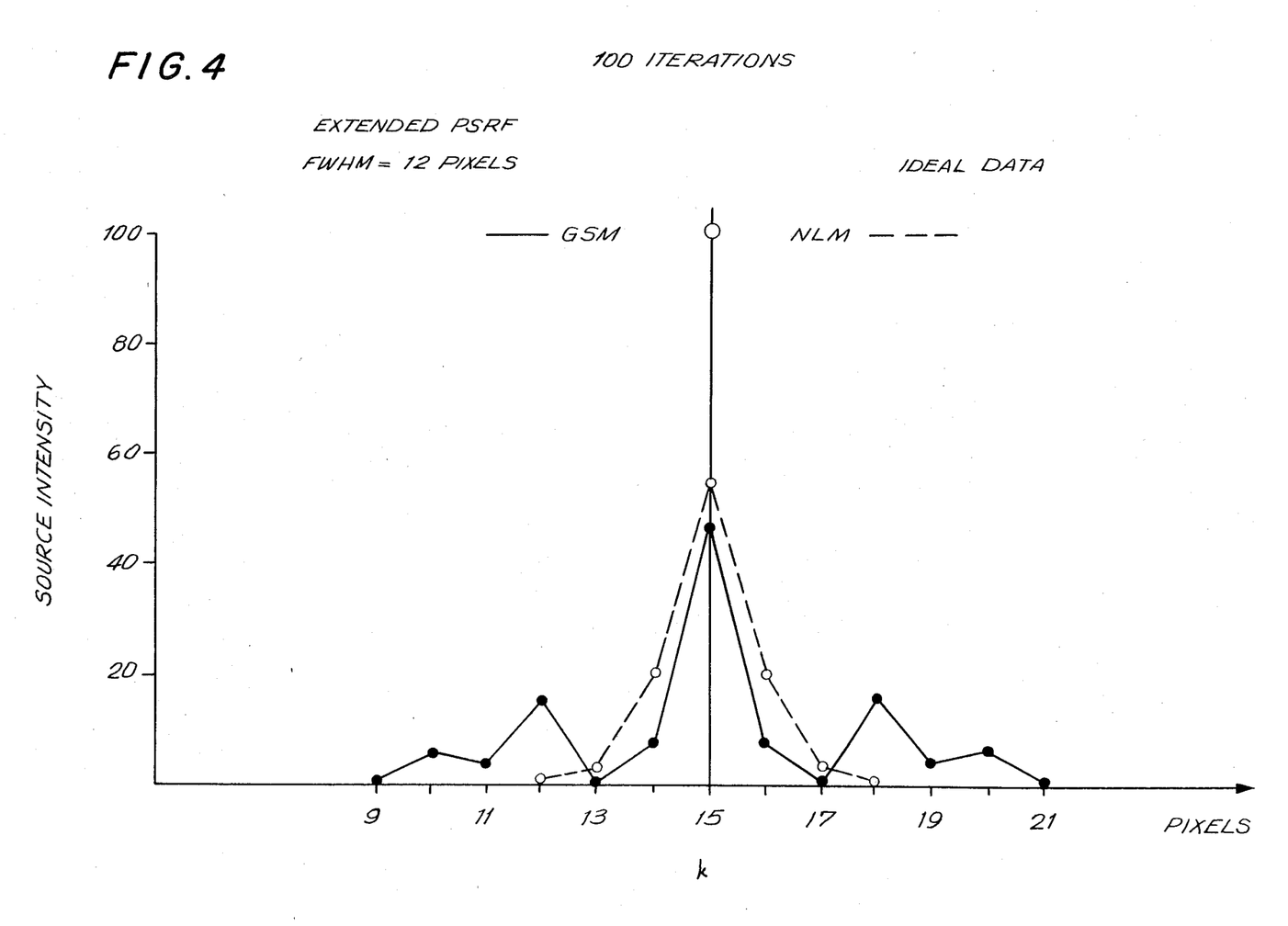
FIG. 4 is a graphic representation comparing the Gauss-Seidel method with the non-local method in accordance with this invention for ideal data after 100 iterations for the single point source of FIG. 1A and for the point source response function of FIG. 1D.

As shown in FIG. 4, for an extended PSRF (FWHM=12 pixels) and exact data, GSM gives rise to substantial spurious "wings," while NLM converges gradually to the correct point source distribution.

Figure 5:
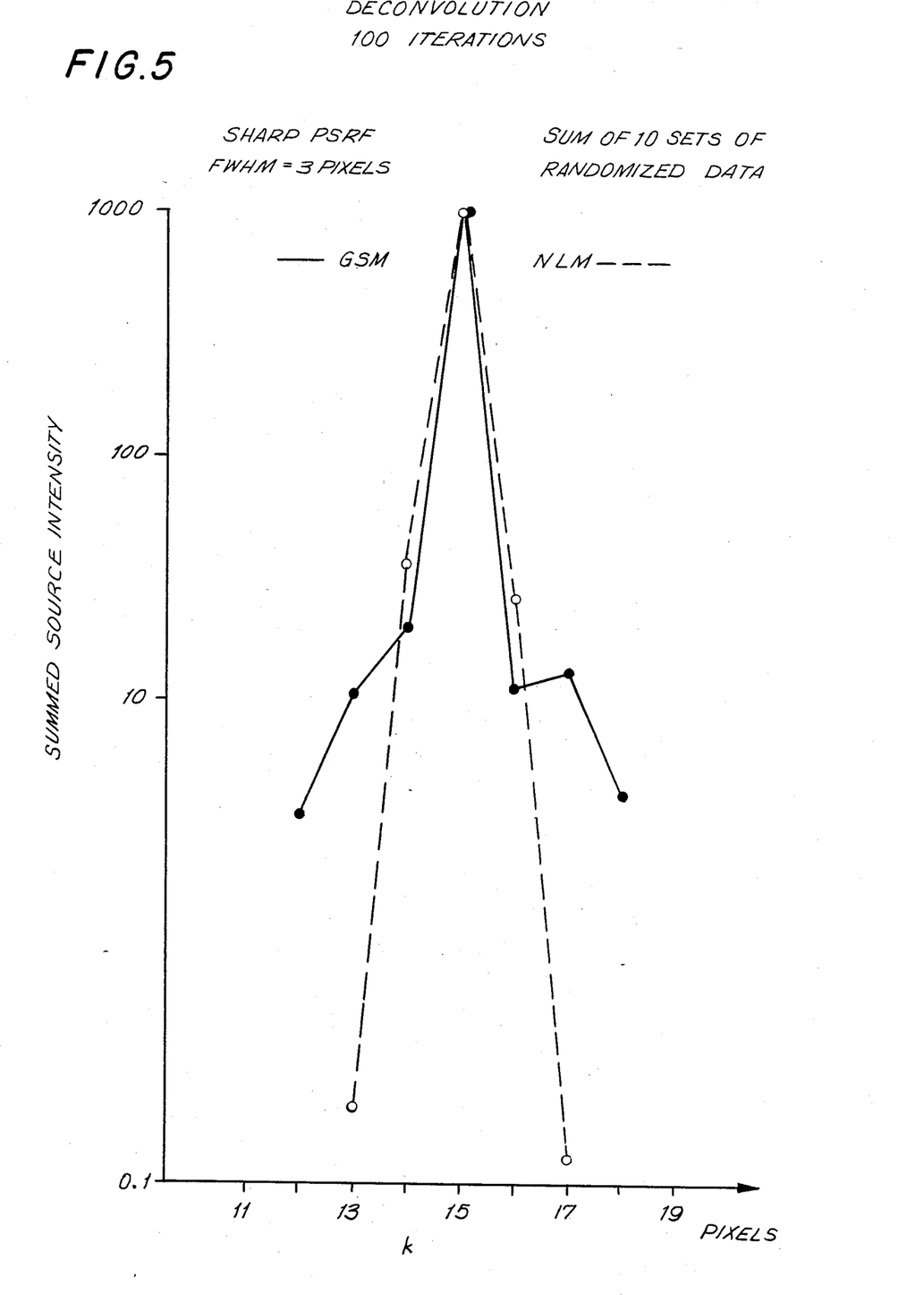
FIG. 5 is a graphic representation comparing the Gauss-Seidel method with the non-local method in accordance with this invention for the sum of ten sets of randomized data after 100 iterations for the single point source of FIG. 1A and for the point source response function of FIG. 1B.
Figure 6:
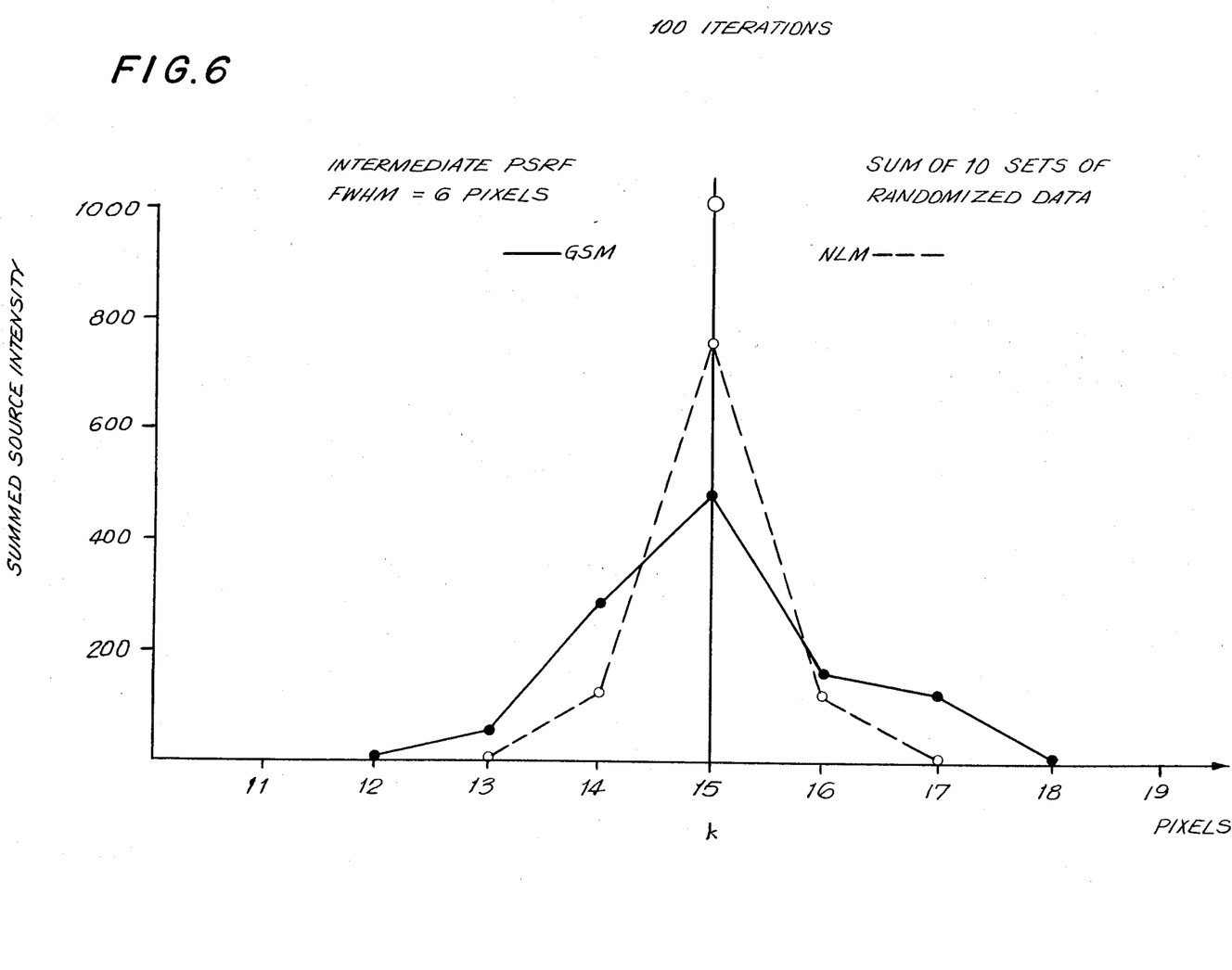
FIG. 6 is a graphic representation comparing the Gauss-Seidel method with the non-local method in accordance with this invention for the sum of ten sets of randomized data after 100 iterations for the single point source of FIG. 1A and for the point source response function of FIG. 1C.
Figure 7:
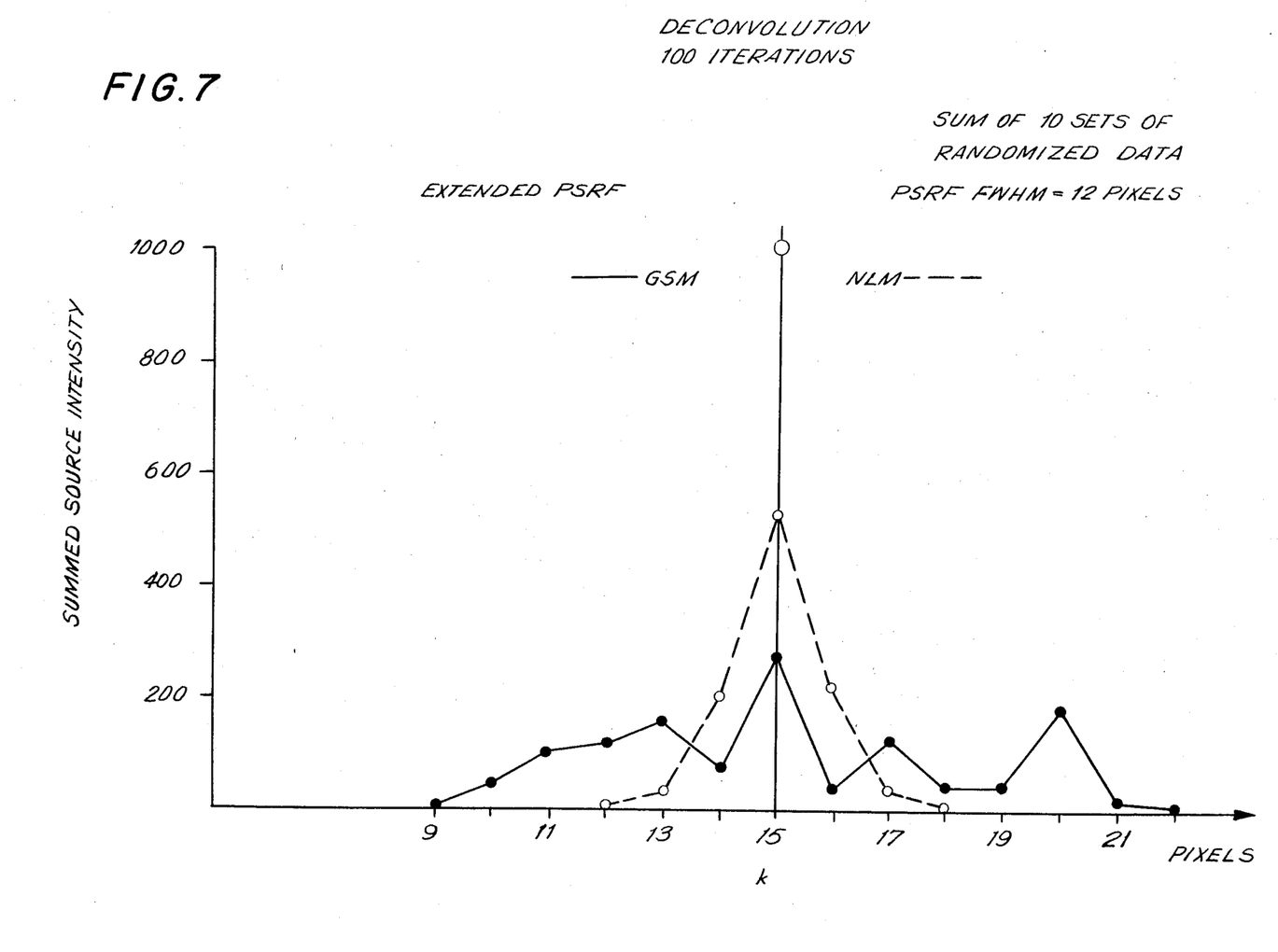
FIG. 7 is a graphic representation comparing the Gauss-Seidel method with the non-local method in accordance with this invention for the sum of ten sets of randomized data after 100 iterations for the single point source of FIG. 1A and for the point source response function of FIG. 1D.

Realistic data was then used reflecting normal radioisotopic statistical fluctuations. In FIGS. 5, 6 and 7, the summed results for the two methods are shown for the same 10 sets of randomized data. In each case, and particularly for the broader PSRFs, NLM was superior in handling noisy data.

Figure 8:
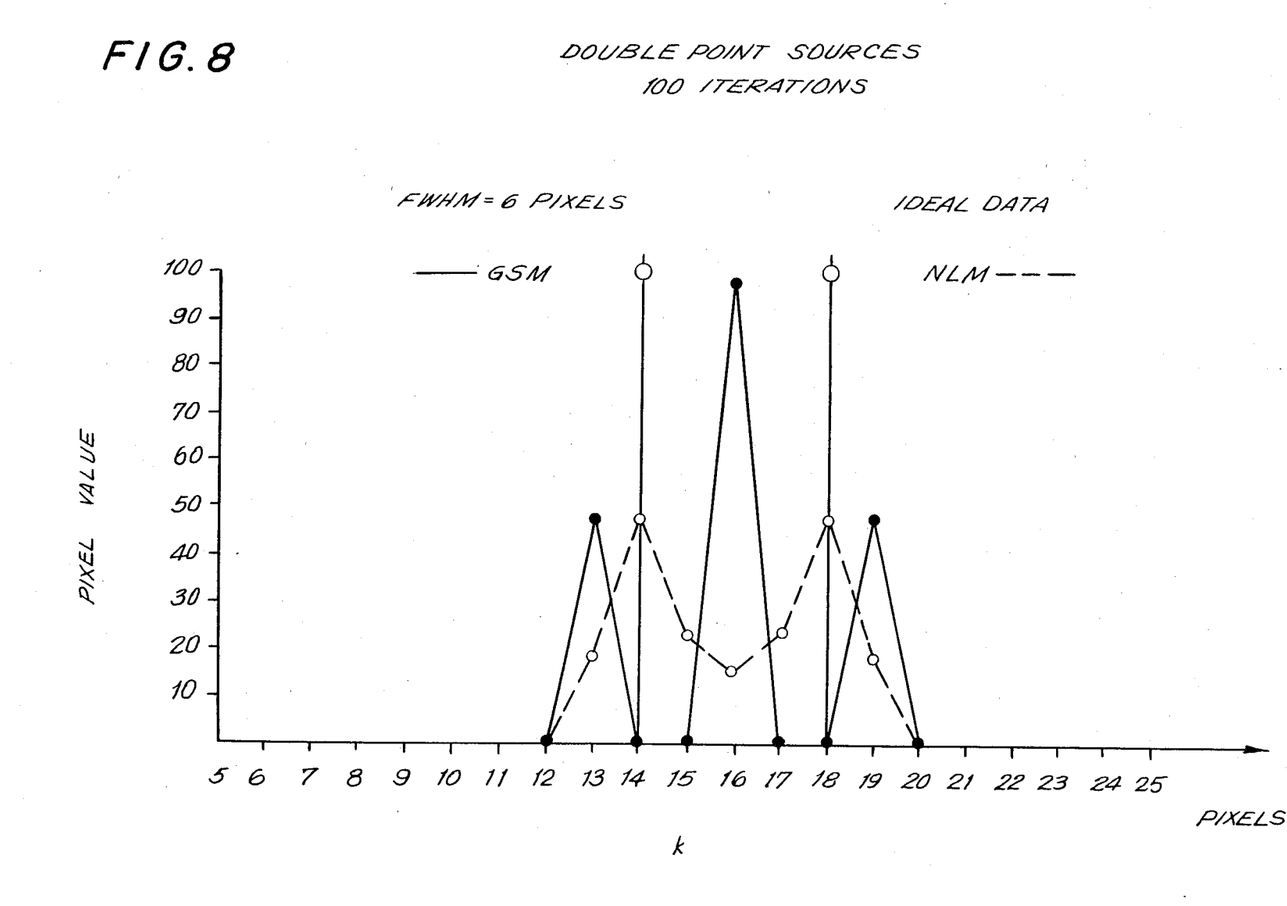
FIG. 8 is a graphic representation comparing the Gauss-Seidel method with the non-local method in accordance with this invention for ideal data after 100 iterations for double point sources and for the point source response function of FIG. 1C for each point source.
Figure 9:
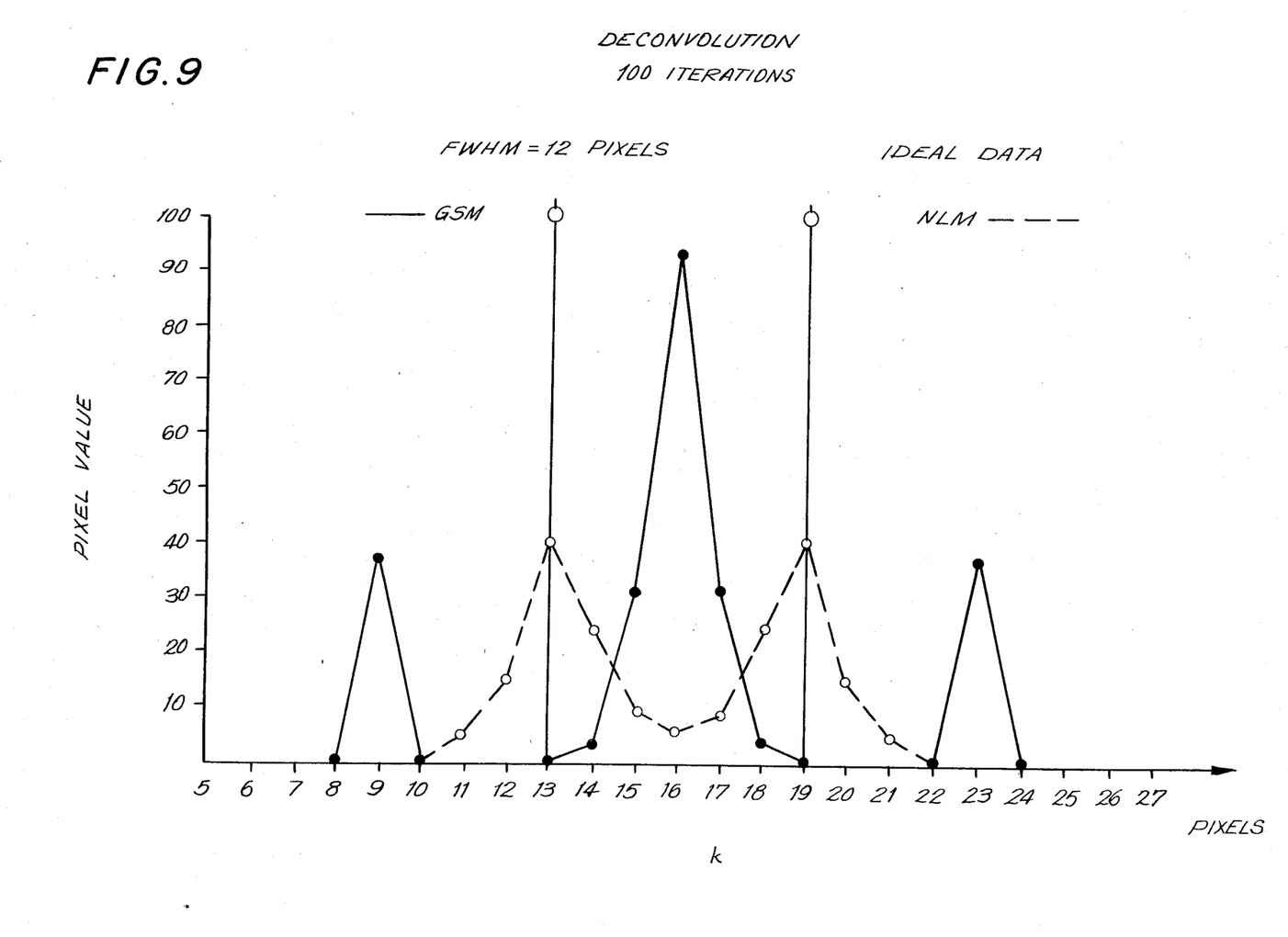
FIG. 9 is a graphic representation comparing the Gauss-Seidel method with the non-local method in accordance with this invention for ideal data after 100 iterations for double point sources and for the point source response function of FIG. 1D for each point source.

The ability of GSM and NLM to resolve two point sources separated by various distances was compared for exact data. For the sharp PSRF (see FIG. 1B) both GSM and NLM converged to the correct double point source configuration. The GSM required fewer iterations. For the intermediate and extended PSRFs (see FIGS. 1C and 1D) NLM continued to gradually converge to the correct double point source configurations, while for certain source separations GSM gave grossly inaccurate results, as shown in FIGS. 8 and 9. These results can be attributed to calculational resonances arising from the spurious "wings" in the Gauss-Seidel single point source deconvolutions noted above. NLM was also more reliable in deconvoluting randomized data from double point sources.

Similar results were observed with single and double point sources in two- and three-dimensional configurations.

In accordance with this invention, it is therefore now possible to obtain reliable three-dimensional radioisotope tissue distributions in a variety of ways. Data can not only be analyzed more accurately from planar projections obtained at various orientations, but tomographic deconvolution should also now be possible by analyzing the data from a simple series of parallel planar data sets corresponding to a sequence of successively increasing patient-to-collimator face separatiohs. This clinically much more convenient approach, employing, for example, large solid angle focussing collimator scanners, such as described in "Three-Dimensional Imaging of Multimillimeter Sized Cold Lesions By Focusing Collimator Coincidence Scanning (FCCS)," by Hart et al., IEEE Transactions on Biomedical Engineering, Vol. BME-24, No. 2, March 1977, or standard gamma cameras is now feTransactions on Biomedical Engineering, Vol. BME-24, No. 2, March 1977, or standard gamma cameras is now feasible because the PSRFs of such imaging systems are strongly dependent upon the source-to-collimator face separation. With improved processing of noisy data, this z-axis dependence is all that is required to provide the necessary depth-dependent information for the tomographic analysis.

The range of application for this invention is not restricted to spatial imaging. It extends in general to many areas wherein measured data includes contributions from more than one element of an unknown source distribution, wherein the response of the measuring system to isolated individual elements of the distribution can be accurately determined, and wherein interactive signal enhancement or suppression among the source elements is not significant. NLM should be quite useful, for example, in spectrographic analysis and, in general, in the processing of complex composite noisy signals whenever the temporal or spatial characteristics of the signal elements comprising the source distribution are accurately known.

It should be noted that the non-local approach is not restricted as such to calculating correction ratios and/or average correction ratios. Iterative corrections to each pixel element can, in principle, also be based upon appropriately weighted sums or other functions of the differences between the calculated and measured values of the pixel and its neighbors.

Finally it should be noted that a variety of methods can be employed to speed up the iterative process. After the first few iterations, the average correction ratios can be proportionally increased (usually by a factor ~1.5). The range for determining the calculated pixel values can be limited to the non-vanishing matrix elements of the PSRFs, and the overall correction ratios can be calculated on the basis of a limited set of the neighboring elements. In three dimensions, for example, there are twenty seven contiguous elements about an interior single pixel element. Even if only these twenty seven elements are used to calculate the overall correction ratio, there are usually enough counts collectively to significantly suppress the effects of radioisotopic statistical fluctuations.

ILLUSTRATIVE NUMERICAL EXAMPLE:

Consider a measuring system in one dimension for which the point source response function is 1,2,4,2,1. This array can be visualized as representing a situation in which the measured value directly over a unit strength point source is 4 and decreases symmetrically with lateral offset in either direction.

Assuming a six element source distribution 0,10,0, 20,10,0 the resulting ideal measured data is readily determined by making use of the PSRF as tabulated below in Table I.

TABLE I

| Source Distribution | (0) | (10) | (0) | (20) | (10) | (0) |
|---|---|---|---|---|---|---|
| Contributions of Source at Pixel 2 | 20 | 40 | 20 | 10 | | |
| Contributions of Source at Pixel 4 | | 20 | 40 | 80 | 40 | 20 |
| Contributions of Source of Pixel 5 | | | 10 | 20 | 40 | 20 |
| Measured Data | 20 | 60 | 70 | 110 | 80 | 40 |
| Pixel | 1 | 2 | 3 | 4 | 5 | 6 |

The contributions of the source at pixels 1,3 and 6 are zero.

The general objective in deconvolution is, of course, to reconstruct the source distribution from the measured data (i.e., work backwards).

The non-local method of deconvolution involves the following operations:

A. Making an initial estimate: An initial estimate can be made in various ways—probably most simply by just normalizing the measured data (i.e., by dividing each data element by $\Sigma$ PSRF, in this case equal to ten).

Therefore:

$DECONV_1 = 2, 6, 7, 11, 8, 4$

B. Calculating the anticipated data from the prior estimate (i.e., $DECONV_1$): The results are tabulated below in Table II.

TABLE II

| $DECONV_1$ | (2) | (6) | (7) | (11) | (8) | (4) |
|---|---|---|---|---|---|---|
| Contribution of $DECONV_1$ at Pixel 1 | 8 | 4 | 2 | | | |
| Contribution of $DECONV_1$ at Pixel 2 | 12 | 24 | 12 | 6 | | |
| Contribution of $DECONV_1$ at Pixel 3 | 7 | 14 | 28 | 14 | 7 | |
| Contribution of $DECONV_1$ at Pixel 4 | | 11 | 22 | 44 | 22 | 11 |
| Contribution of $DECONV_1$ at Pixel 5 | | | 8 | 16 | 32 | 16 |
| Contribution of $DECONV_1$ at Pixel 6 | | | | 4 | 8 | 16 |
| $CALC_1 =$ | 27 | 53 | 72 | 84 | 69 | 43 |
| PIXEL | 1 | 2 | 3 | 4 | 5 | 6 |

C. Calculating the individual correction ratios of the measured data elements to the corresponding calculated data elements:

| PIXEL | 1 | 2 | 3 | 4 | 5 | 6 |
|---|---|---|---|---|---|---|
| $\frac{DATA(i)}{CALC(i)} =$ | $\frac{20}{27}$ | $\frac{60}{53}$ | $\frac{70}{72}$ | $\frac{110}{84}$ | $\frac{80}{69}$ | $\frac{40}{43}$ |
| INDIVIDUAL CORRECTION RATIOS | .74 | 1.13 | .97 | 1.31 | 1.16 | .93 |

D. Calculating the overall correction ratio: The above individual correction ratios which in each case differ from 1.0 indicate that $DECONV_1$ must somehow be corrected. An overall correction ratio for each pixel point is now determined, as indicated above, by forming weighted averages of these individual correction ratios. To simplify the presentation, statistical fluctuations will not be taken into account. All measured data values can then be considered to be intrinsically equally reliable and the factors $F_1$ can be set equal to unity throughout. Therefore, only the weighting factors $F_2$ enter into the determination of the overall correction ratios:

For Pixel 1, the overall correction ratio (OCR) is:

$$OCR_1 = \frac{\frac{8}{27}(.74) + \frac{4}{53}(1.13) + \frac{2}{72}(.97)}{\frac{8}{27} + \frac{4}{53} + \frac{2}{72}} = 0.83$$

For Pixel 2, the overall correction ratio is:

$$OCR_2 = \frac{\frac{12}{27}(.74) + \frac{24}{53}(1.13) + \frac{12}{72}(.97) + \frac{6}{84}(1.31)}{\frac{12}{27} + \frac{24}{53} + \frac{12}{72} + \frac{6}{84}} = 0.966$$

For Pixels 3,4,5 and 6, the same procedure is applied. The results are indicated below.

$OCR(i) = 0.83 \quad 0.966 \quad 1.014 \quad 1.131 \quad 1.091 \quad 1.011$

E. Calculating the next DECONV: The array $DECONV_1$ is now altered by multiplying each of its elements by the corresponding overall correction ratio. For example, at pixel 1, $DECONV_2$ is $2 \times 0.83$; at pixel 2, $DECONV_2$ is $6 \times 0.966$; etc. The results are indicated below:

$DECONV_2 = 1.66 \quad 5.80 \quad 7.10 \quad 12.44 \quad 8.73 \quad 4.04$

The iteration proceeds by substituting $DECONV_2$ for $DECONV_1$ in section B above, and repeating operations B, C, D and E. This procedure results in $DECONV_3$ and so on.

Using a programmed computer as the apparatus for performing the above-described deconvolution process, the deconvolution process is quite rapid for this simple one-dimensional case (2000 iterations in about one minute) with the final results listed below.

| Source Distribution | 0 | 10 | 0 | 20 | 10 | 0 |
|---|---|---|---|---|---|---|
| $DECONV_{2000}$ | 0.022 | 9.897 | 0.132 | 19.963 | 9.921 | 0.060 |

Note that after 2000 iterations, the deconvolution array closely matches the actual source distribution.

The rate of convergence of the deconvolution process is indicated below in Table III.

TABLE III

| | PIXEL | | | | | |
|---|---|---|---|---|---|---|
| | 1 | 2 | 3 | 4 | 5 | 6 |
| $DECONV_2$ | 1.662 | 5.800 | 7.146 | 12.461 | 8.730 | 4.054 |
| $DECONV_{100}$ | 0.348 | 8.229 | 2.380 | 19.362 | 8.654 | 1.015 |
| $DECONV_{200}$ | 0.207 | 9.007 | 1.300 | 19.662 | 9.224 | 0.583 |
| $DECONV_{300}$ | 0.145 | 9.319 | 0.884 | 19.768 | 9.469 | 0.400 |
| $DECONV_{400}$ | 0.111 | 9.484 | 0.667 | 19.823 | 9.600 | 0.303 |
| $DECONV_{500}$ | 0.089 | 9.586 | 0.535 | 19.857 | 9.680 | 0.243 |
| $DECONV_{600}$ | 0.075 | 9.655 | 0.445 | 19.880 | 9.733 | 0.203 |
| $DECONV_{700}$ | 0.064 | 9.704 | 0.382 | 19.897 | 9.772 | 0.174 |
| $DECONV_{800}$ | 0.056 | 9.741 | 0.334 | 19.909 | 9.801 | 0.152 |
| $DECONV_{900}$ | 0.050 | 9.770 | 0.296 | 19.919 | 9.823 | 0.135 |
| $DECONV_{1000}$ | 0.045 | 9.793 | 0.266 | 19.927 | 9.841 | 0.121 |
| $DECONV_{1100}$ | 0.041 | 9.812 | 0.242 | 19.934 | 9.856 | 0.110 |
| $DECONV_{1200}$ | 0.037 | 9.828 | 0.222 | 19.939 | 9.868 | 0.101 |
| $DECONV_{1300}$ | 0.035 | 9.841 | 0.204 | 19.944 | 9.878 | 0.093 |
| $DECONV_{1400}$ | 0.032 | 9.853 | 0.190 | 19.948 | 9.887 | 0.086 |
| $DECONV_{1500}$ | 0.030 | 9.863 | 0.177 | 19.951 | 9.895 | 0.081 |
| $DECONV_{1600}$ | 0.028 | 9.871 | 0.166 | 19.954 | 9.901 | 0.075 |
| $DECONV_{1700}$ | 0.026 | 9.879 | 0.156 | 19.957 | 9.907 | 0.071 |
| $DECONV_{1800}$ | 0.025 | 9.886 | 0.147 | 19.959 | 9.913 | 0.067 |
| $DECONV_{1900}$ | 0.024 | 9.892 | 0.139 | 19.961 | 9.917 | 0.063 |
| $DECONV_{2000}$ | 0.022 | 9.897 | 0.132 | 19.963 | 9.921 | 0.060 |

Figure 10:
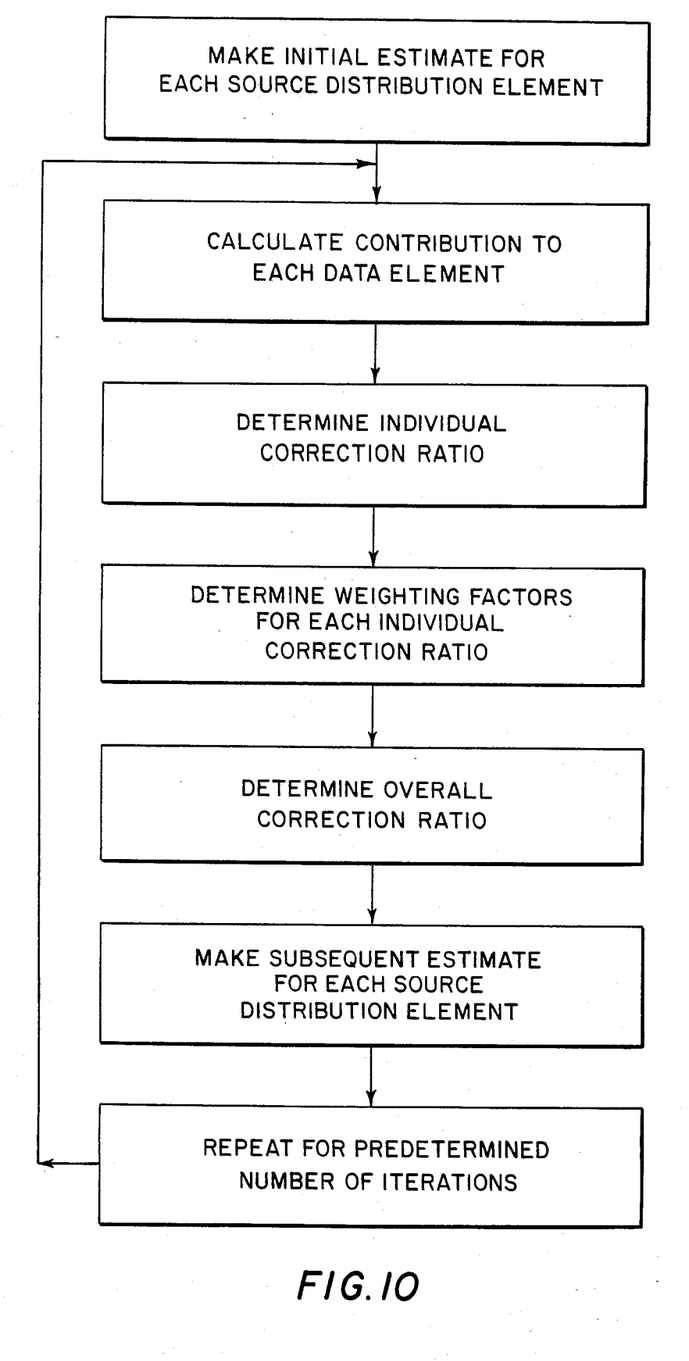
FIG. 10 is a flow chart indicating the operation of an apparatus embodying the present invention.

Referring to FIG. 10, the flow chart there illustrated demonstrates in graphic form the operation of an apparatus embodying the present invention. Such apparatus includes:

(1) means to make an initial estimate for each source distribution element, (2) means to calculate a contribution to each data element, (3) means to determine an individual correction ratio for each data element, (4) means to determine weighting factors for each individual correction ratio, (5) means to determine an overall correction ratio, (6) means to make a subsequent estimate for each source distribution element, and (7) means to repeat steps (2)-(6) for a predetermined number of iterations.

It will be understood that each of the elements described above, or two or more together, may also find a useful application in other types of constructions differing from the types described above.

While the invention has been illustrated and described as embodied in a deconvolution method and apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A deconvolution method of determining by operation of a deconvolution apparatus the source distribution elements of a source distribution using a plurality of measured data elements obtained by a measuring system having known response characteristics, comprising the steps of:

(a) making an initial estimate for each source distribution element from the measured data elements;

(b) calculating a contribution to each data element from each previously estimated source distribution element;

(c) determining an individual correction ratio for each data element by dividing each respective measured data element by the sum of the calculated contribution to that data element;

(d) determining weighting factors for each individual correction ratio as a function of each previously estimated source distribution element;

(e) determining an overall correction ratio for each source distribution element from the individual correction ratios determined in step (c) and from the weighting factors determined in step (d);

(f) making a subsequent estimate for each source distribution element from the overall correction ratio determined in step (e); and (g) repeating steps (b), (c), (d), (e) and (f) for each subsequent estimate for a predetermined number of iterations, and determining, fong steps (b), (c), (d), (e) and (f) for each subsequent estimate for a predetermined number of iterations, and determining, for each iteration, updated weighting factors and updated overall correction ratios, whereby the source distribution is reconstructed from the measured data elements.

2. A deconvolution apparatus for determining the source distribution elements of a source distribution using a plurality of measured data elements obtained by a measuring system having known response characteristics, comprising:

(a) means for making an initial estimate for each source distribution element from the measured data element;

(b) means for calculating a contribution to each data element from each previously estimated source distribution element;

(c) means for determining an individual correction ratio for each data element by dividing each respective measured data element by the sum of the calculated contributions to that data element;

(d) means for determining weighting factors for each individual corrections ratio as a function of each previously estimated source distribution element;

(e) means for determining an overall correction ratio for each source distribution element from the individual correction ratios and from the weighting factors;

(f) means for making a subsequent estimate for each source distribution element from the overall correction ratio; and (g) means for repeating the operation of the aforementioned means for each subsequent estimate for a predetermined number of iterations, including means for determining, for each iteration, updated weighting factors and updated overall correction ratios, whereby the source distribution is reconstructed from the measured data elements.

* * * * *